United States Patent [19]

Stocker

[11] Patent Number: 4,995,265

[45] Date of Patent: Feb. 26, 1991

[54] DEGRADATION AND CONTAMINATION COMPENSATED TUNING FORK QUARTZ MONOMETER, AND METHOD TO COMPENSATE FOR TUNING QUARTZ DEGRADATION AND CONTAMINATION

[75] Inventor: Rudolf Stocker, Azmoos, Switzerland

[73] Assignee: Balzers Aktiengesellschaft, Balzers, Liechtenstein

[21] Appl. No.: 452,112

[22] Filed: Dec. 14, 1989

[30] Foreign Application Priority Data

Jan. 23, 1989 [CH] Switzerland ............... 00205/89

[51] Int. Cl.[5] ............................................. G01L 11/00
[52] U.S. Cl. ..................................... 73/702; 310/338; 310/370
[58] Field of Search ................. 73/702, 708, 384; 310/370, 338

[56] References Cited

U.S. PATENT DOCUMENTS

| 4,507,970 | 4/1985 | Dinger | 73/702 |
| 4,741,213 | 5/1988 | Hojoh | 73/702 |

FOREIGN PATENT DOCUMENTS

| 0180297 | 5/1986 | European Pat. Off. . |
| 0233054 | 8/1987 | European Pat. Off. . |

OTHER PUBLICATIONS

Design and Testing of a Quarty Friction Vacuum Gauge Using a Self-Oscillating Circuit, by M. Hirata et al, 1987, American Vacuum Society, pp. 2393-2396.
Frequency Dependence of a Quartz Oscillator on Gas Pressure by K. Kokubuin et al, Jun. 3, 1985; 1985 American Vacuum Soc.
Unified Formula Describing the Impedance Dependence of a Oscillator on Gas Pressure by K. Kokubun et al; Jan. 5, 1987; 1987 American Vacuum Society.

*Primary Examiner*—Donald O. Woodiel
*Attorney, Agent, or Firm*—Frishauf, Holtz, Goodman & Woodward

[57] ABSTRACT

In the present pressure measurement process the damping signal of a tuning fork quartz manometer, which is a measure of the prevailing pressure, is so combined with the correction value proportional to the resonant frequency that a measurement result is obtained, which is independent of any contamination of the tuning fork quartz. Apart from the resonant frequency ($f_R$) of the measuring quartz (11), preferably also the resonant frequency ($f_R'$) of a reference quartz (21) kept at constant pressure is determined. Thus, the damping signal ($R_S$) can be corrected by a correction value proportional to the difference between the two reference frequencies ($R_R'-f_R$), which is substantially temperature-independent.

16 Claims, 5 Drawing Sheets

DEGRADATION AND CONTAMINATION COMPENSATED TUNING FORK QUARTZ MONOMETER, AND METHOD TO COMPENSATE FOR TUNING QUARTZ DEGRADATION AND CONTAMINATION

Cross reference to related applications, assigned to the assignee of this application: U.S. Ser. No. 07/450,857, filed Dec. 14, 1989, Stocker. U.S. Ser. No. 07/450,856, filed Dec. 14, 1989, Stocker et al.

1. Field of the Invention

The present invention relates to a process for measuring pressure by means of a tuning fork quartz manometer or pressure gauge and an apparatus for performing this process.

2. Background

The use of tuning fork quartz oscillators, such as are e.g. used in quartz-operated watches or clocks, for measuring pressure in the vacuum field is known. Two indirect measuring methods can be used.

The first method makes use of the fact that the resonant frequency of a tuning fork quartz is dependent on the ambient pressure (K. Kokubun et al: "Frequency dependence of quartz oscillators on gas pressure", in J. Vac. Sci. Technol. A 3 (6), November/December 1985, 2184 ff). However, this measuring method fails below a pressure limit of approximately $10^4$ Pa, because below this value the resonant frequency only changes to such a limited extent that a usable evaluation is no longer possible, so that then this method cannot be used in practice.

The second method, which is now used in many different ways, is based on the pressure dependence of the damping, i.e. the pressure-variable quality of the oscillating circuit of the quartz, which is e.g. evaluated by measuring the series resistance at resonant frequency (K. Kokubun et al: "Unified formula describing the impedance dependence of a quartz oscillator on gas pressure", in J. Vac. Sci. Technol. A 5 (4), July/August 1987, 2450 ff; EP-0-180-297-A2; EP-0-233-054-A2). This leads to a usable measuring range of approximately 1 to $10_5$ Pa and a relative measuring accuracy of approximately 10%.

However, it is an important disadvantage of such tuning fork quartz manometers that both the resonant frequency and the series resistance are not only dependent on the pressure, but also on a large number of other parameters and influences. Apart from the mechanical, electrical and thermodynamic construction of the manometer, see the solution in patent application Ser. No. 07/450,857, filed Dec. 14, 1989, by the inventor hereof, and the gas type in the measuring volume, see patent application Ser. No. 07/450,856, filed Dec. 14, 1989, by the inventor hereof jointly with Walter Schaedler, an important influence on the measurement. behaviour is contamination and dirt on the quartz surface.

Such contamination of the measuring member, as occur in substantially all indirectly measuring vacuum gauges (e.g. Pirani and ionization gauges), are primarily due to the deposition of oil vapour from the vacuum pump on the quartz surface, as well as other influences. Although this can in principle be counteracted by cleaning or replacing the quartz, the problem is serious, because up to now there has been no way in which it was possible to determine the degree of contamination or to compensate for its effects by a measuring technology. In the case of manometers based on the measurement of the change of quality or damping in a circuit, such a contamination results in creeping falsification of the measured results. This leads to considerable uncertainty, especially in the case of longer measuring series, in which a cleaning or replacing of the quartz is not possible for reasons of measurement constancy.

THE INVENTION

It is an object of the present invention to provide a process for measuring pressure by means of tuning fork quartz manometers and a corresponding apparatus, which supplies substantially contamination-independent measured results.

Briefly, a tuning fork quartz is operated at resonant frequency. It is exposed to a measuring volume, and the pressure in the measuring volume is determined by evaluating a damping value which corresponds to the oscillation damping of the quartz or, in other words, to the series resistance of the quartz, which is measure of quartz oscillating circuit damping. The output signal, representative of this damping, is corrected for degradation or contamination of the quartz, which changes its oscillation frequency, by providing a reference value representative of the resonant frequency of the quartz when new and uncontaminated. The difference between the actual resonant frequency and the reference frequency can then be used as a correction value. In accordance with a feature of the invention, the reference frequency is obtained from an essentially identical tuning fork quartz, operated under substantially similar temperature conditions as the measuring tuning fork quartz, but isolated from external influences which might cause degradation or contamination thereof.

The invention is based on the finding that the damping and the resonant frequency of a tuning fork quartz are dependent both on the pressure and the contamination, but that surprisingly the pressure influence during damping is much more significant than the contamination, whereas the resonant frequency is greatly dependent on the contamination, but is only dependent to a limited extent on the pressure.

The advantage of the present invention is that the simultaneously present influences of pressure and contamination can be separated, so that a continuous monitoring and/or compensation of the changes to the oscillating behaviour of the tuning fork quartz caused by surface contamination is made possible. Thus, it is possible to obtain a contamination-independent tuning fork quartz manometer, which is clearly superior as regards measuring precision and ease of maintenance to the conventional tuning fork quartz manometers or Pirani gauges working in the same field. A preferred embodiment of the invention also makes it possible to detect and correspondingly compensate corrosive influences, which cannot be eliminated even with periodic cleaning.

DRAWINGS

The process and a preferred embodiment of the invention are described in greater detail hereinafter relative to the drawings, wherein show:

FIG. 1 A typical resonant frequency/pressure dependence curve.

FIG. 2 A typical series resistance/pressure dependence curve.

FIG. 3 An example of a construction of a tuning fork quartz manometer.

FIG. 4 A preferred construction of a tuning fork quartz manometer.

FIG. 5 A block diagram illustrating the measuring system using the measuring process of the invention.

FIG. 6 An example of a circuit arrangement using the measuring process of the invention.

DETAILED DESCRIPTION

Figure 1:
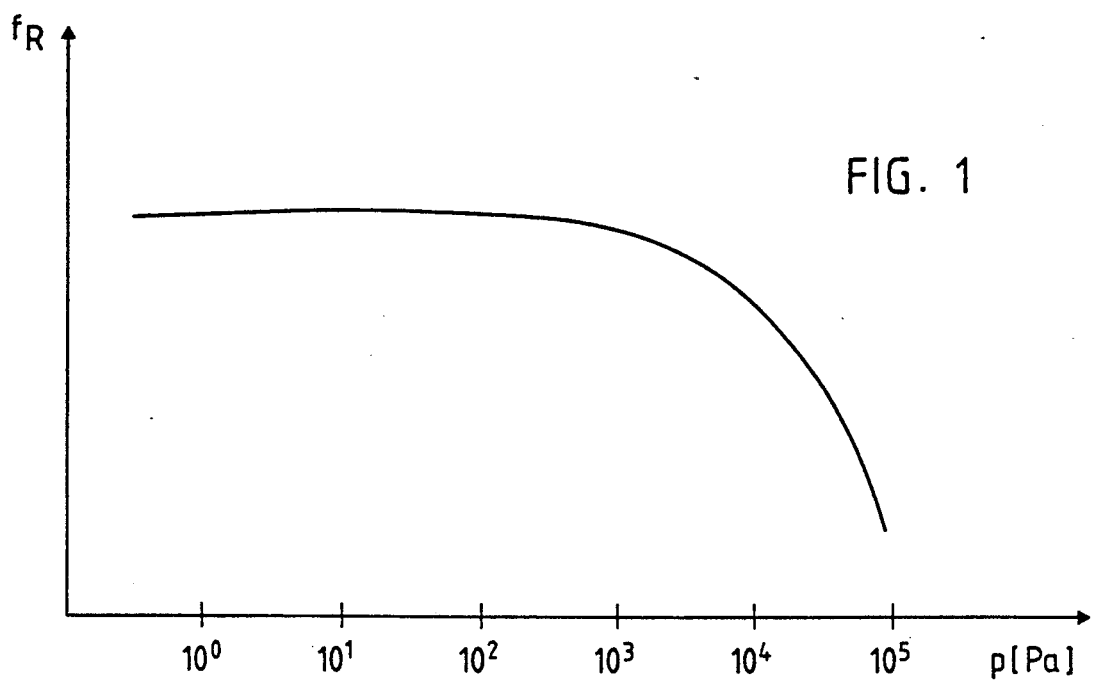
Figure 2:
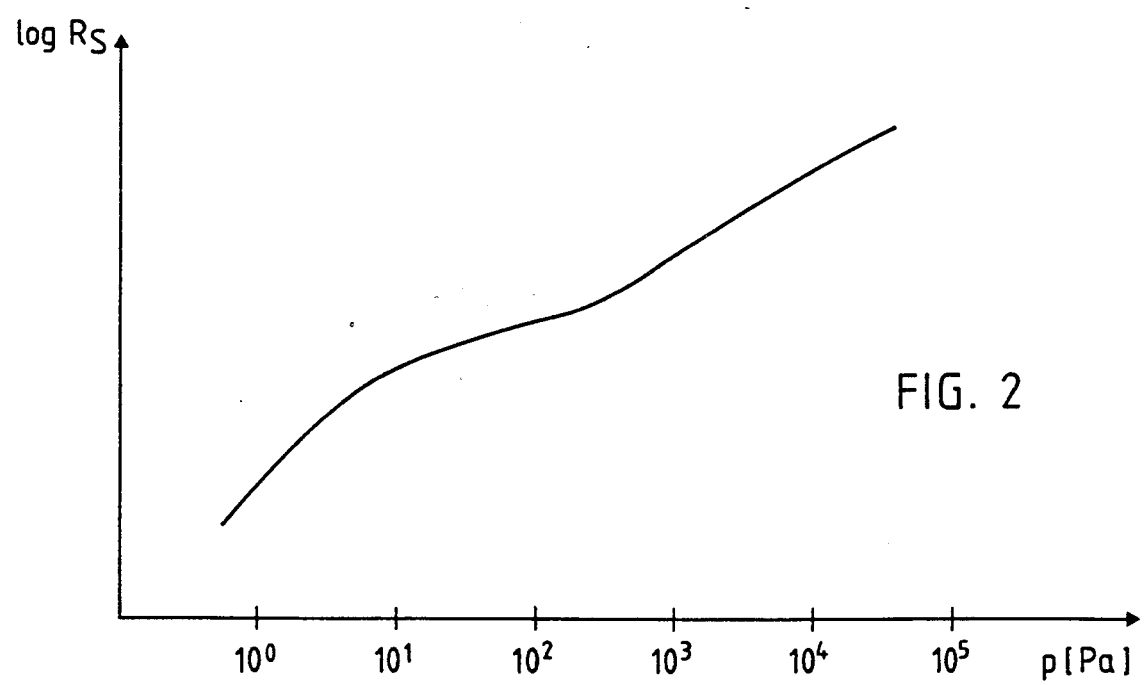

FIG. 1 shows the qualitative path of the resonant frequency $f_R$ of a tuning fork quartz as a function of the pressure p. FIG. 2 shows the corresponding path of the series resistance $R_S$, which serves as a measure for the oscillation damping of the quartz. The representations are limited to the appropriately usable pressure range of tuning fork quartz manometers between approximately $10^0$ and $10^5$ Pa. Whilst the resonant frequency remains substantially constant below approximately $10^{-4}$–$10^3$ Pa, the series resistance has a quasilogarithmic path over the entire pressure range. Thus, as has already been mentioned, it is apparent that a pressure measurement via the resonant frequency relatively quickly is confronted by physical limits, whereas an evaluation of the series resistance is now possible over roughly 5 decades. The curves shown are to be understood in a purely qualitative manner and can differ as a function of the actual circumstances (temperature, gas type, etc.).

As a result of contamination of the quartz surface e.g. by deposits, the mass of the quartz increases, so that its oscillating behaviour changes. The quality of the oscillating circuit decreases, i.e. the reciprocal damping e.g. series resistance correspondingly increases, whilst the resonant frequency decreases. Thus, naturally the measuring accuracy of a tuning fork quartz manometer is impaired. Although it has been observed that the contamination influences the such changes to the measuring characteristic are naturally undesired. Particularly in the case of longer lasting series of measurements, this leads to an increasing falsification of the measured results.

It has surprisingly been discovered that the resonant frequency, which is only slightly pressure-variable, is significantly dependent on contamination. As pressure measurement via the resonant frequency is not productive, no significance has been attached to this up to now. The present invention is based on correcting the damping signal (series resistance), known to be suitable for pressure determination, by a contamination coefficient determined by measuring the resonant frequency. A number of mathematical considerations are given hereinafter to facilitate understanding. These more particularly apply for the pressure range P~$10^3$ Pa, which is completely adequate, because the influence of contamination on damping at higher pressures is negligible and does not generally have to be compensated.

For the series resistance $R_S$ as a measure for the quartz oscillating circuit damping as:

$$R_S = R_0 + R \quad (1)$$

$$R = \alpha p + \beta m \quad (2)$$

m designates the mass applied to the tuning fork by contamination, p is the pressure and $R_0$ the residual resistance at p=0 and m=0, whilst $\alpha$ and $\beta$ are positive coefficients.

For the series resonance frequency $f_R$ of the quartz, the following applies:

$$f_R = f_0 - f \quad (3)$$

$$f = \gamma p + \delta m \quad (4)$$

In this $f_0$ is the resonant frequency at p=0 and m=0, whilst $\gamma$ and $\delta$ are positive coefficients.

The resolution of equations (1) to (4) on the basis of pressure p gives:

$$\alpha \approx 5 \cdot 10^2 \, \Omega/Pa$$

$$\gamma \approx 10^{-4} \, Hz/Pa$$

$$(\alpha\delta/\beta\gamma) \approx 5000;$$

An experimental determination of the coefficients with conventional oscillating quartzes in the 32 kHz range gives the following typical values:

$$\alpha \approx 5 \, 10^2/Pa$$

$$\gamma \approx 10^{-4} Hz/Pa$$

$$(\alpha\delta/\beta\gamma) \approx 5000$$

Physically, the value $\alpha\delta/\beta\gamma$ is a measure of the differential contamination sensitivities of the two pressure measuring methods. The pressure measurement by measuring the resonant frequency reacts approximately by a factor of 5000 more sensitively on the contamination than the measurement of the pressure by measuring the damping (series resistance).

On the basis of these numerical values, the denominator on the right hand side of equation (5) can be set equal to 1:

$$p = (1/\alpha) \cdot (R - [\beta/\delta] \cdot f) \quad (6)$$

Thus, with the above numerical values:

$$p = (2 \cdot 10^{-3} Pa/\Omega \cdot R) - (2 Pa/Hz \cdot f) \quad (7)$$

The quantities $R_0$ and $f_0$ are determined or taken into account by prior calibration or balancing. Thus, in equations (6) and (7) it is possible to substitute the values R or f by $(R_S - R_0)$ or $(f_R - f_0)$ and consequently it follows from equation (6):

$$p = (1/\alpha) \cdot (R_S - [\beta/\delta] \cdot f_R) - \{(1/\alpha) \cdot (R_0 - [\alpha/\epsilon] \cdot f_0)\} \quad (8) \text{ or}$$

$$p = (1/\alpha) \cdot (R_S - [\beta/\delta] \cdot f_R) + K_1 \quad (9)$$

Equations (8) and (9) show how, by evaluating the two available output signals of the oscillating quartz, i.e. $R_S$ and $f_S$, it is possible to measure the effective pressure according to the invention in a contamination-independent manner. $K_1$ is a pure constant, which can be taken into account by calibrating a corresponding measuring circuit.

Figure 3:
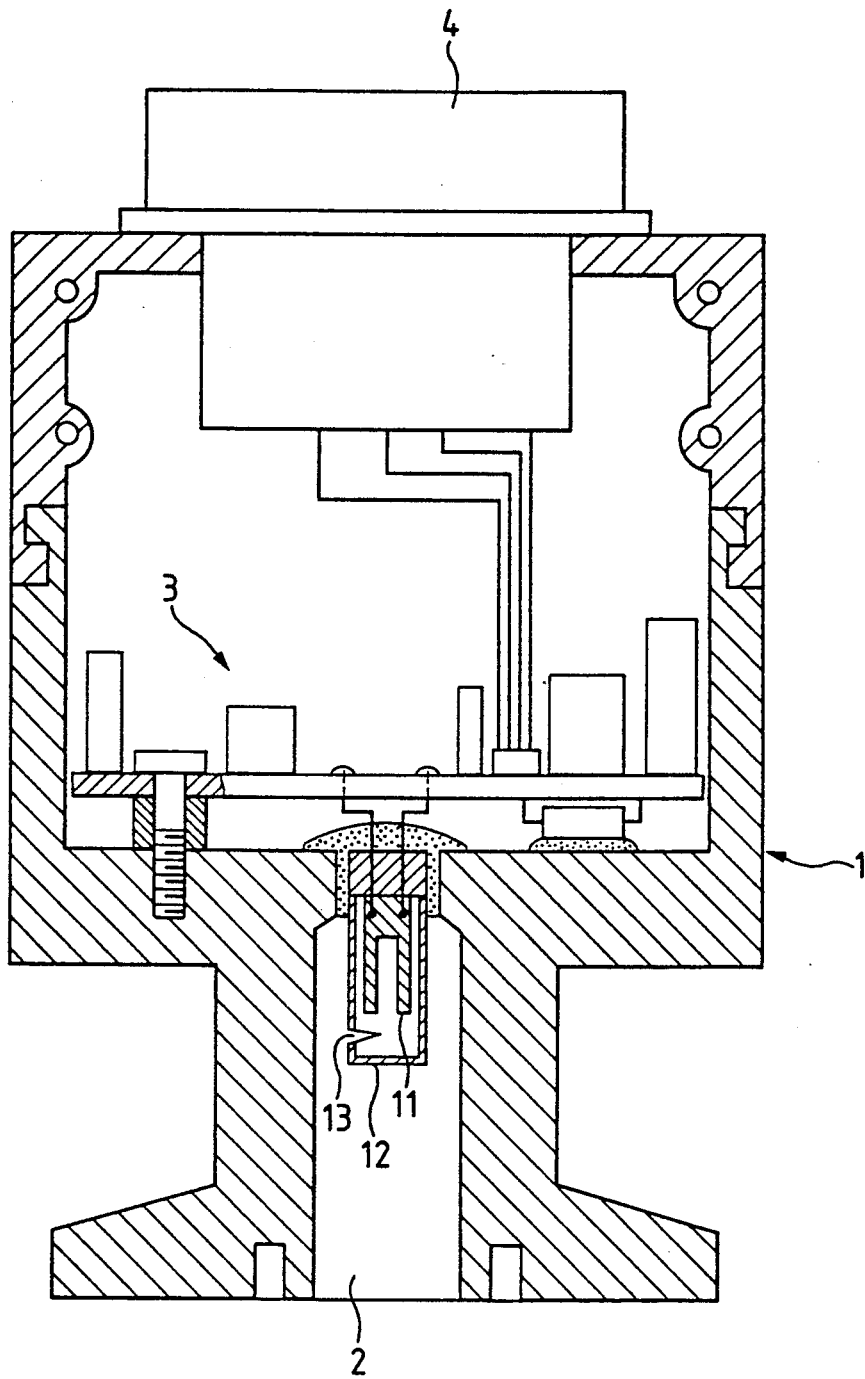

FIG. 3 shows an embodiment of a measuring apparatus for performing the process according to the invention. The apparatus comprises a housing or casing 1, which can be connected to a measuring volume, not shown. The housing has a bore 2 open towards the measuring volume. The housing retains a commercially available clock or watch quartz 11. The latter is surrounded by a protective envelope 12, which has a lateral opening 13, so that a pressure connection between the quartz and the measuring volume is obtained. Housing 1 also contains an electronic circuit 3 for operating the quartz and for evaluating its output signals. A tuning fork quartz measuring probe which, due to the substantial avoidance of mechanical and thermal interference effects is particularly suitable in connection with the inventive process has been described in aforementioned application Ser. No. 07/450,857, filed Dec. 14, 1989, by the inventor hereof.

An apparatus realization of equation (9) is possible by solving the equation in analog or digital circuitry as will appear below, or by storing the function as a program in a microprocessor integrated e.g. into circuit 3. By prior calibration the constants according to equation (9) are determined and either set in hardware or software, or an indication or display is adjusted to p=0 by calibration at high vacuum, i.e. at a pressure value below the sensitivity of the manometer. In both cases obviously a combination of hardware and software solutions also being possible, the contamination error-free measuring value of result can be supplied across a connector 4 to an indicating or display unit and/or transferred to a computer for further processing.

Further details are given hereinafter of a preferred construction of the invention. In the case of the tuning fork quartz manometer shown in FIG. 4, the same reference numerals are used as in FIG. 3. However, the manometer of FIG. 4 additionally has a second oscillating quartz 21, which is housed in a closed bore 22 of casing 1, is kept at constant pressure and is electrically connected to circuit 3. As the pressure in bore 22 is naturally also temperature-dependent, the bore is preferably evacuated to such an extent that the remaining pressure is below the response threshold of the tuning fork quartz. In practice it is sufficient if the pressure is below approximately $10^1$ Pa.

The advantage of such a construction is essentially that through a suitable combination of the output signals of the measuring quartz 11 with those of the reference quartz 21, it is possible to achieve a substantial compensation of the temperature dependence of the resonant frequency. In equation (9), where during the pressure measurement by measuring the series resistance the influence of contamination is corrected by the term $\beta/\delta \cdot f_R$, the fact is ignored that the resonant frequency $f_R$ is dependent on the temperature as well as the contamination. By using a reference quartz 21, which on the one hand has the same temperature characteristic as the measuring quartz 11, but is enclosed in area 22 and therefore not exposed to contamination, a temperature-independent contamination compensation is obtained. This is shown by the following mathematical considerations. As above the contamination and temperature-dependent resonant frequency of the measuring quartz 11 is designated $f_R$ $f_R'$ is the contamination-independent and to the same extent temperature-dependent resonant frequency of reference quartz 21. Thus, the correction term of equation (9) can read:

$$\beta/\delta \cdot f_R = \beta/\delta \cdot (f_R - f_R') = \beta/\delta \cdot f_R' \quad (10)$$

As $f_R$ and $f_R'$ have the same temperature characteristic, their difference is temperature-independent, i.e. is solely influenced by the contamination. By calibration at a given temperature, the term $\beta/\delta \cdot f_R'$ can be converted into a constant, so that now equation (9) can be written:

$$p = 1/\alpha \cdot (R_S \beta/\delta [f_R' - f_R]) + K_s \quad (11)$$

$K_2$ is a pure constant, which can be eliminated by calibrating the corresponding measuring circuit or can be taken into account by software.

Figure 4:
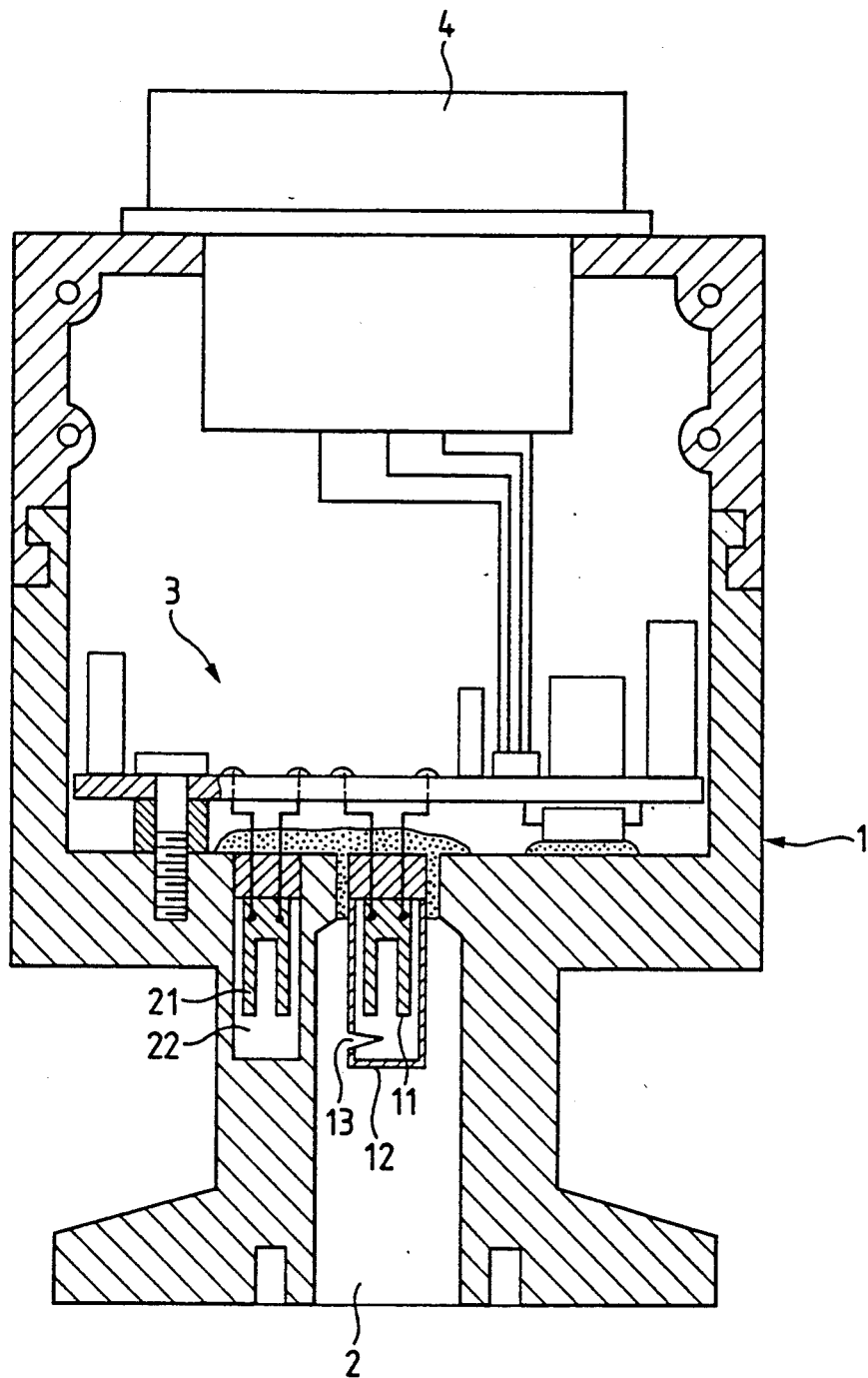
Figure 5:
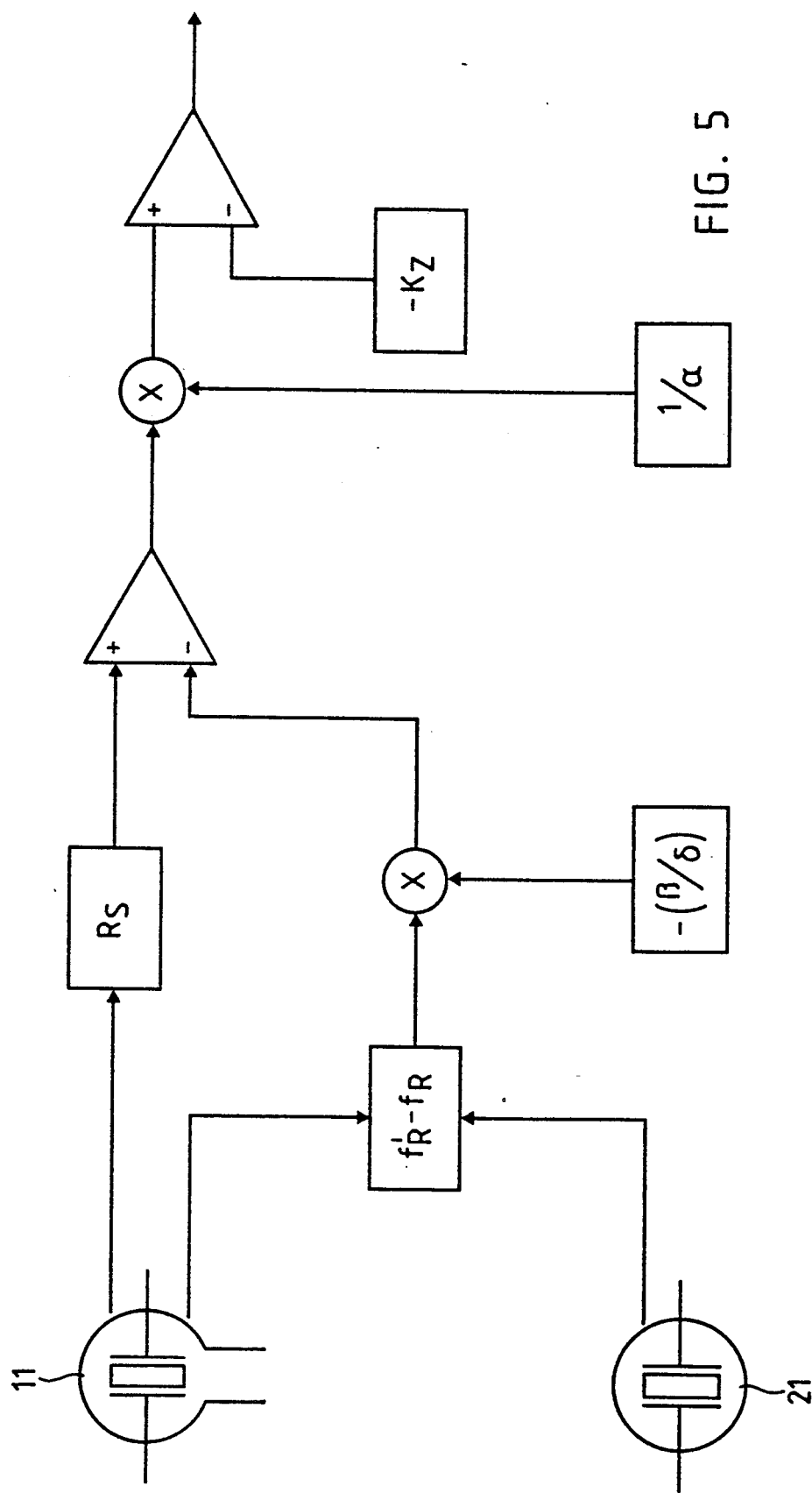
Figure 6:
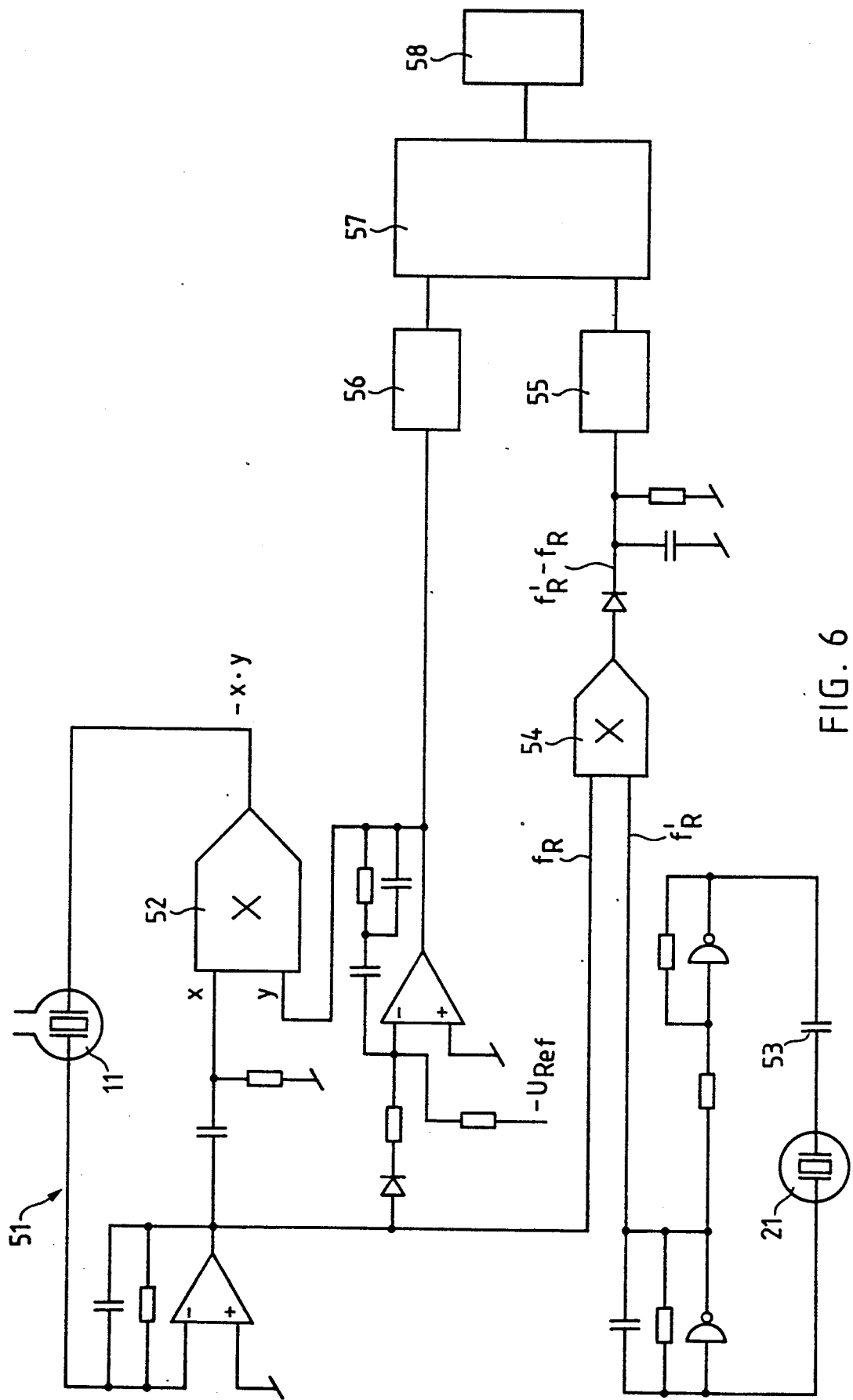

FIG. 5 shows a schematic block circuit diagram for the sensor of FIG. 4, and calculating the pressure function represented in equation (11). A specific construction of this circuit, which can also be done by software as well as by hardware, is shown in FIG. 6. The measuring quartz 11 is preferably arranged in a self-oscillating control loop 51, a constant oscillation amplitude e.g. being ensured by means of a multiplier 52. The control factor necessary for maintaining this oscillation amplitude and in the usual way designated y, is a measure of the damping or quality of the resonant circuit. By a capacitor 53 connected in series with the reference quartz 21, the resonant frequency $f_R'$ of the reference quartz 21 is adjusted a few Hz higher, to ensure that the difference $(f_R' - f_R)$ formed in a modulator 54 is always positive. This frequency difference is determined in a digital frequency meter 55 to obtain a digital value and in the same way as a control signal y digitized in a A/D converter 56 is supplied to a series-connected computer 57. The measurement result determined according to the invention in computer 57 is subsequently transferred to a display unit 58.

It is obviously possible, instead of or in addition to a direct compensation of the contamination, to provide for a detection and display thereof, because the difference of the two resonant frequencies $(f_R' - f_R)$ available at terminal 54a is a qualitative measure of the contamination. If in a simple construction no direct contamination compensation is provided, then a contamination display can e.g. be such that it produces an acoustic/optical warning signal when the contamination exceeds a certain predetermined level, which indicates when the quartz has to be cleaned or replaced.

A further, hitherto unsolved problem of tuning fork quartz manometers is that the oscillation characteristic of the quartz is modified not only by the contamination, but also by the corrosive influences of gases in the measuring volume. In particular, the fine vapour-deposited electrodes of the quartz can be corroded, which leads to a change in the oscillation characteristic and therefore to increasing imprecision of the measurement results. By comparing the output signals of the measuring quartz 11 with those of the reference quartz 21, the latter not being exposed to the corrosive gases, it is possible to additionally carry out corrosion monitoring of a manometer of the aforementioned type. If a comparison of these output signals reveals that a predetermined and adjustable tolerance value is exceeded, it is once again possible to indicate that the corrosion has reached an extent requiring quartz replacement.

In general, the inventive process, i.e. analyzing the combination of the damping and frequency signals, can be used for compensating all effects, which lead to falsifications of measured results and in which a substantial invariance of the resonant frequency stands against an increase or decrease. This inter alia relates to interference effects, which are caused by water vapour in the measuring volume.

For reasons of completeness it is pointed out that the measuring process is not only usable when the quality or the reciprocal thereof i.e. the oscillation damping of the quartz thereto is determined by measurement of the series resistance. As the series resistance is merely a preferred measure for the damping, which in turn can be determined in other ways (e.g. via the voltage necessary for maintaining the resonance or the corresponding current, measurement of the width of the resonance curve, determination of the decay constants of the oscillation, etc.), the process can obviously be used in the same way in all pressure measuring methods by means of quality measurement or damping measurement respectively.

The measuring process of the invention is not limited to the pressure range discussed here. This range is the present conventional range for tuning fork quartzes, but it is conceivable that in future quartzes with a larger measuring range will become available.

I claim:

1. Process for measuring pressure with a tuning fork quartz operated at resonant frequency, in which the pressure (p) of a measuring volume is determined by measuring a damping value corresponding to the oscillation damping of the quartz, characterized in that the damping value is combined with a correction value proportional to the resonant frequency ($f_R$).

2. Process according to claim 1, characterized in that the damping value is combined with the correction value in such a way that the measured pressure value is determined substantially independently of changes of the mass of the tuning fork quartz.

3. Process according to claim 1, characterized in that the damping value is determined by measuring the series resistance ($R_S$) of the tuning fork quartz.

4. Process according to claim 1, characterized in that the resonant frequency ($f_R'$) of a second oscillating tuning fork quartz (21) not connected to the measuring volume and kept at constant pressure is determined, its frequency response substantially having the same temperature characteristic as that of the first tuning fork quartz (11) and that the damping value is combined with a value proportional to the difference between the resonant frequencies ($f_R, f_R'$).

5. Process according to claim 4, characterized in that the second oscillating quartz (21) is kept at a constant pressure, which is below the response limit of the tuning fork quartz manometer.

6. Process according to claims 4, characterized in that the second oscillating tuning fork quartz (21) is so tuned that its resonant frequency ($f_R'$) under the same conditions is higher than that ($f_R$) of the first tuning fork quartz (11).

7. Apparatus to measure pressure carrying out the process of claim 1 comprising
a first tuning fork quartz (11) exposed to the measuring volume;
an electronic circuit (3) including a self-oscillating circuit portion, to which said first tuning fork quartz is connected, said electronic circuit providing an output signal ($R_S$) at the actual oscillation frequency ($f_R$) of said first tuning fork quartz; and
means for providing a reference frequency representative of a standard resonant frequency of said tuning fork quartz,
said reference frequency providing means being connected to said electronic circuit (3) for correcting said output signal based on deviation of the oscillation frequency ($f_R$) of said first tuning fork quartz from said reference frequency.

8. The apparatus of claim 7, wherein said oscillating circuit comprises a self-oscillating control loop (51).

9. The apparatus of claim 7, wherein said means (21) for providing a reference frequency comprises a second tuning fork quartz (21) which has a dependence of frequency on temperature which is essentially the same as that of said first tuning fork quartz (11), said exposed to essentially the same temperature as said first tuning fork quartz,
said second tuning fork quartz being located within a space (22) of essentially constant pressure.

10. The apparatus of claim 9, wherein said space (22) of essentially constant pressure comprises a chamber (22) retaining said second tuning fork quartz (21).

11. The apparatus of claim 10, wherein said chamber retaining said second tuning fork quartz is at a pressure which is below the response threshold of the second tuning fork quartz (21) to pressure variations.

12. The apparatus of claim 9, further including a capacitor (53) in circuit with said second tuning fork quartz and said electronic circuit, to provide a frequency shift for the circuit of said second tuning fork quartz;
and circuit means (54, 57) for combining the shifted frequency from the second tuning fork quartz-capacitor circuit and the frequency of oscillation of said first tuning fork quartz, and deriving a correction signal representative of the deviation of said standard frequency from said shifted frequency, said correction signal being applied to said output signal ($R_S$).

13. The apparatus of claim 12, including a computer (57) for, at least in part, processing the damping signal and the correction signal and for providing a corrected output signal representative of damping of oscillations in said first tuning fork quartz independently of frequency variations thereof.

14. The apparatus of claim 12, further including output means (54a) providing an output representative of change in the frequency of oscillation of said first tuning fork quartz (11) with respect to said standard resonant frequency when in ungraded, uncontaminated state,
said terminal being coupled to said second tuning fork quartz (21) and the series connected capacitor (53) as well as to a signal representative of the actual oscillation frequency ($f_R$) of said first tuning fork quartz.

15. The apparatus of claim 9, further including output means (54a) providing an output representative of change in the frequency of oscillation of said first tuning fork quartz (11) with respect to said standard resonant frequency when in ungraded, uncontaminated state.

16. The apparatus of claim 9, further including circuit means (54, 57) for combining said reference frequency from the second tuning fork quartz-capacitor circuit and the frequency of oscillation of said first tuning fork quartz, and deriving a correction signal representative of the deviation of said standard frequency from said shifted frequency, said correction signal being applied to said output signal ($R_S$).

* * * * *